United States Patent [19]
Morikita

[11] Patent Number: 5,512,223
[45] Date of Patent: Apr. 30, 1996

[54] APPARATUS AND METHOD FOR LOCAL PRESSURIZING TYPE INJECTION MOLDING

[75] Inventor: Nobuo Morikita, Chiba, Japan

[73] Assignee: Sumitomo Heavy Industries, Ltd., Japan

[21] Appl. No.: 283,705

[22] Filed: Aug. 1, 1994

[30] Foreign Application Priority Data

Aug. 4, 1993 [JP] Japan .................................. 5-193263

[51] Int. Cl.$^6$ ........................ B29C 45/57; B29C 45/40; B29C 45/38
[52] U.S. Cl. ........................ 264/71; 264/161; 264/328.7; 264/328.8; 264/334; 425/554; 425/555; 425/556; 425/566; 425/DIG. 51
[58] Field of Search ........................ 264/71, 154, 161, 264/328.1, 328.7, 328.8, 328.12, 334; 425/553, 554, 555, 556, 562, 566, 577, DIG. 51

[56] References Cited

U.S. PATENT DOCUMENTS

| | | | |
|---|---|---|---|
| 4,710,124 | 12/1987 | Harrison | 425/554 |
| 5,340,528 | 8/1994 | Machida et al. | 425/555 |

FOREIGN PATENT DOCUMENTS

| | | | |
|---|---|---|---|
| 596270 | 11/1994 | European Pat. Off. . | |
| 63-11316 | 1/1988 | Japan | 425/554 |
| 5-228969 | 9/1993 | Japan | 425/555 |
| 321596 | 6/1957 | Switzerland . | |
| 24298 | 12/1993 | WIPO | 425/555 |

OTHER PUBLICATIONS

Patent Abstracts of Japan vol. 12, No. 495 23 Dec. 1988.
Patent Abstracts of Japan, vol. 9, No. 252 9 Oct. 1985.
Patent Abstracts of Japan, vol. 15, No. 93 6 Mar. 1991.
Patent Abstracts of Japan vol. 17, No. 260 21 May 1993.
Patent Abstracts of Japan, vol. 13, No. 258 15 Jun. 1989.

*Primary Examiner*—Jill L. Heitbrink
*Attorney, Agent, or Firm*—Lorusso & Loud

[57] ABSTRACT

A local pressurizing type injection molding apparatus including a stationary die, a movable die disposed for movement into and out of contact with the stationary diet a first local pressurizing pin extending through the movable die and having a tip facing a gate, and a second local pressurizing pin extending through the movable die and having a tip facing the cavity. The apparatus is further provided with first advancing mechanism for advancing the first local pressurizing pin, second advancing mechanism for advancing the second local pressurizing pint and a device for individually setting the points in time at which advancing movements of the first local pressurizing pin and the second local pressurizing pin are started and for individually setting the pressurizing pressures given by the first local pressurizing pin and the second local pressurizing pin. One processing action is given to a molded product by advancing the first local pressurizing pin while another processing action is given to the molded product by advancing the second local pressurizing pin. Accordingly, in the case where two or more kinds of processing operations are performed, the processing operations can be started at different points in time and can be effected with different pressures.

10 Claims, 4 Drawing Sheets

APPARATUS AND METHOD FOR LOCAL PRESSURIZING TYPE INJECTION MOLDING

BACKGROUND OF THE INVENTION

1. Field of the Invention

The present invention relates to an apparatus and method for local pressurizing type injection molding.

2. Description of the Related Art

In a conventional injection molding machine, a screw is disposed in a heating cylinder for rotational and reciprocating movement with respect to the heating cylinder. In a metering stage, the screw is retracted while being rotated so as to accumulate a molten resin in front of the screw, and in a charging stage, the screw is advanced to inject the molten resin into a cavity in a die through an injection nozzle, thereby filling the cavity with the molten resin.

The die is composed of a stationary die and a movable die. The movable die is advanced and retracted by a mold opening/closing apparatus so that the movable die contacts and separates from the stationary die. Resin is charged into the cavity after mold closing, in which the movable die is contacted with the stationary die, and mold clamping, in which the movable die is pressed against the stationary die. After cooling, the resin becomes a molded product. Subsequently, mold opening is effected for separating the movable die from the stationary die, and the molded product is thrust out by projecting an ejector pin from the stationary die.

In the resin charging stage, the resin injected from the injection nozzle enters a runner through a sprue and is then charged into the cavity through a gate. In the case where the gate is a submarine type, a portion of the molded product corresponding to the gate (hereinafter referred to as a "gate portion") is automatically broken and is separated from the molded product when the molded product is thrust out. However, a mark formed due to the gate (hereinafter referred to as "gate mark") or flashes are left on the molded product from which the gate portion has been separated. Accordingly, further processing is needed to remove the gate mark or flashes, resulting in increased costs.

To obviate the above-described problem, a local pressurizing type injection molding machine has been proposed in which a pressurizing pin is disposed at a location corresponding to the gate portion and is advanced to close the gate. In this case, generation of a gate mark and flashes can be prevented.

In addition, it is possible to dispose another pressurizing pin other than the pressurizing pin for gate-closing to perform a processing operation on a molded product as well as to perform gate-closing. However, the timing at which the gate-closing is started cannot be made different from the timing at which the processing operation is started. Similarly, the pressurizing force for the gate-closing cannot be made different from the pressurizing force for the processing operation.

If a pressurizing pin for gate-closing and another pressurizing pin attached to the same pressurizing plate are simultaneously advanced, in addition to gate-closing, other actions can be performed such as, for example, prevention of the formation of a sink due to contraction of the resin upon cooling, punching of a hole, formation of a thin wall portion, and compression molding for an optical part.

To make the surface corresponding to the gate smooth, it is necessary to start the gate-closing at a relatively early timing. On the contrary, to prevent the formation of a sink, it is preferred to impose pressure on the resin as the cooling process proceeds, and is necessary to start the gate-closing at a relatively late point in time.

Since the pressurizing pin for gate-closing and the other pressurizing pin are mounted on a single pressurizing plate and are advanced by advancing movement of the pressurizing plate, the timing for the gate-closing becomes the same as the timing for another processing operation.

Moreover, the pressurizing force for gate-closing is the same as that for the processing operation, because the pressurizing plate is advanced by a single pressurizing cylinder.

SUMMARY OF THE INVENTION

In view of the foregoing problems involved in conventional local pressurizing type injection apparatuses, it is an object of the present invention to provide a local pressurizing type injection molding apparatus in which two or more kinds of processing operations can be effected for a mold product using different timing with different pressures.

To achieve the above object, a local pressurizing type injection molding apparatus according to the present invention is provided with a stationary die, a movable die disposed for movement into and out of contact with the stationary die to define a cavity between the dies, a first local pressurizing pin extending through the movable die and having a tip facing a gate, and a second local pressurizing pin extending through the movable die and having a tip facing the cavity. The apparatus is further provided with first advancing means for advancing the first local pressurizing pin, second advancing means for advancing the second local pressurizing pin, and means for individually setting the timing at which advancing movements of the first local pressurizing pin and the second local pressurizing pin are started and for individually setting the pressurizing pressures given by the first local pressurizing pin and the second local pressurizing pin.

One processing action is given to a mold product by advancing the first local pressurizing pin while another processing action is given to the mold product by advancing the second local pressurizing pin. Accordingly, in the case where two or more kinds of processing operations are performed, the processing operations can be started at different points in time and can be effected with different pressures.

In another local pressurizing type injection molding apparatus according to the present invention, at least one of the first and second advancing means is provided with vibrating means. In this case, one of the first and second local pressurizing pins is advanced while being vibrated, thereby facilitating the processing operation.

In still another local pressurizing type injection molding apparatus according to the present invention, the first advancing means is pressurizing means, and the second advancing means is ejector means. In this case, the first local pressurizing pin performs an additional processing operation such as, for example, prevention of the formation of a sink due to contraction of the resin upon cooling, punching of a hole, formation of a thin portion, and compression molding for an optical part, while the second local pressurizing pin performs gate-closing as a primary processing operation. These processing operations can be started at different points in time and can be effected with different pressures.

In still another local pressurizing type injection molding apparatus according to the present invention, the first advancing means is ejector means, and the second advancing means is pressurizing means. In this case, the first local pressurizing pin performs gate-closing as a primary processing operation. The second local pressurizing pin performs an additional processing operation such as, for example, prevention of the formation of a sink due to contraction of the resin upon cooling, punching of a hole, formation of a thin wall portion, and compression molding for an optical part. These processing operations can be started at different points in time and can be effected with different pressures.

In still another local pressurizing type injection molding apparatus according to the present invention, there are provided a stationary die, a movable die disposed for movement into and out of contact with the stationary die to define a cavity between the dies, a first local pressurizing pin extending through the movable die and having a tip facing a gate, and a second local pressurizing pin extending through the movable die and having a tip facing the cavity.

There is provided a first pressurizing plate to which the first local pressurizing pin is fixed and by which the second local pressurizing pin is supported such that a gap is formed at the rear end of the second local pressurizing pin. Ejector means is disposed for advancing the first pressurizing plate.

A second local pressurizing plate is also disposed at the rear side of the first pressurizing plate for separable contact with the first pressurizing plate and for separable contact with the second local pressurizing pin. Pressurizing means is disposed for advancing the second pressurizing plate.

Accordingly, the first pressurizing plate is advanced by the ejector means so that the first local pressurizing pin is advanced to close the gate. Subsequently, the second pressurizing plate is advanced by the pressurizing means so that the second local pressurizing pin is advanced to push the resin from bosses into the cavity.

Accordingly, even in the case where the resin in the cavity shrinks upon cooling, after the charging of the resin is stopped by the separation of the cavity from the runner due to gate-closing, the pressure of the resin in the cavity can be made uniform, because the resin in the bosses is pushed into the cavity by the first and second local pressurizing pins. As a result, it is possible to prevent the formation of a sink at a thick-wall portion.

In this case advancing movements by the pressurizing means and the ejector means can be individually started at different points in time. Accordingly, gate-closing can be started at a point in time different from that for starting pressurizing. Further, since the gate-closing and the pressurizing are effected by different cylinders, i.e., the ejector cylinder and the pressurizing cylinder, the molding process can be controlled in accordance with an arbitrary program in which different pressures are used for the gate-closing and the pressurizing.

In the method for local pressurizing type injection molding according to the present invention, a cavity formed between a stationary die and a movable die is filled with a resin through a gate, a first local pressurizing pin having a tip facing a gate is advanced at a first point in time, and a second local pressurizing pin having a tip facing the cavity is advanced at a second point in time different from the first point in time.

One processing action is given to the molded product by advancing the first local pressurizing pin while another processing action is given to the molded product by advancing the second local pressurizing pin. Accordingly, in the case where two or more kinds of processing operations are performed, the processing operations can be started at different points in time. This makes it possible to provide a smooth finished surface corresponding at the gate, and to prevent the formation of a sink.

In another method for local pressurizing type injection molding according to the present inventions the pressurizing force imparted by the first local pressurizing pin is different from the pressurizing force imparted by the second local pressurizing pin. Accordingly, both the processing operation by the first local pressurizing pin and the processing operation by the second local pressurizing pin can be performed properly.

In still another method for local pressurizing type injection molding according to the present inventions at least one of the first local pressurizing pin and the second local pressurizing pin is advanced while being vibrated to facilitate the processing operation.

BRIEF DESCRIPTION OF THE DRAWINGS

Various other objects, features and many of the attendant advantages of the present invention will be readily appreciated as the same become better understood by reference to the following detailed description of the preferred embodiments when considered in connection with the accompanying drawings, in which.

DESCRIPTION OF PREFERRED EMBODIMENTS

The present invention will now be described by way of preferred embodiments in connection with the accompanying drawings.

Figure 1:
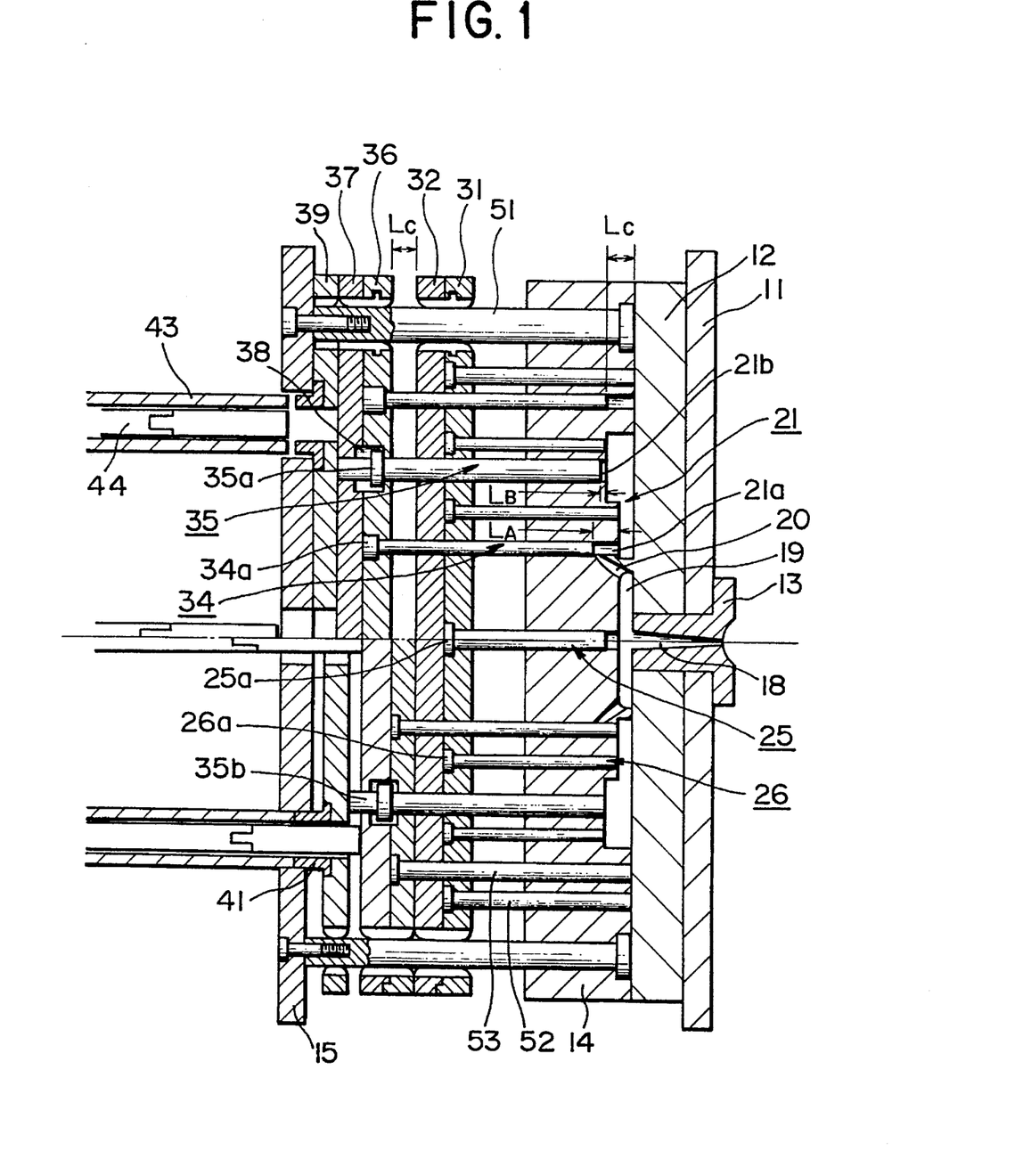
FIG. 1 is a sectional view of a local pressurizing type injection molding machine according to a first embodiment of the present invention.
Figure 2:
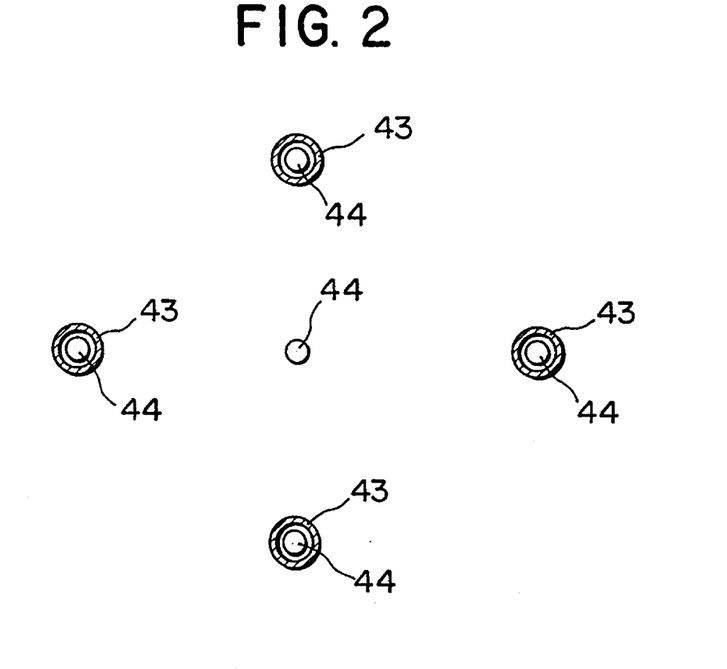
FIG. 2 is a sectional view of the pressurizing sleeves and the ejector rods of the injection molding machine shown in FIG. 1.

In FIGS. 1 and 2, 11 denotes a stationary die mounting plate, and 12 denotes a stationary die. The stationary die 12 is mounted on an unillustrated stationary platen via the stationary die mounting plate 11. In an injection step, an unillustrated injection device is advanced so that a tip end of an unillustrated injection nozzle is brought into contact with a sprue bush 13 of the stationary die 12.

On the other hand, an unillustrated movable platen is advanced and retracted by an unillustrated mold opening/closing device so that a movable die 14 is brought into and out of contact with the stationary die 12. To this end, the movable die 14 is mounted on the movable platen through a movable die mounting plate 15 and an unillustrated spacer block. A resin injected from the injection nozzle is passed through a sprue 18, a runner 19 and submarine gates 20, and is charged into a cavity 21 defined between the stationary and movable dies 12 and 14.

After completion of the injection step, a pressure maintaining step starts in which the pressure on the resin within the cavity 21 is maintained, and at the same time, the cooling of the resin is started. After a lapse of a given time, both the dies 12 and 14 are opened with a molded product (not illustrated) left on the movable die 14, and the molded product is thrust out by an ejector.

For this purpose, a sprue lock pin 25 and ejector pins 26 are disposed. The sprue lock pin 25 is positioned opposing the sprue 18 and is adapted to retain the molded product and leave it on the movable die 14 during opening of the dies. The ejector pins 26 are disposed with their tip ends facing the cavity 21, the runner 19, etc. and adapted to separate and thrust out the molded product down from the movable die 14 after the opening of the dies.

Head portions 25a and 26a formed at the rear ends of the sprue lock pin 25 and the ejector pins 26 are clamped by ejector plates 31 and 32 to be fixed thereto. The ejector plates 31 and 32 are supported for advance and retract movements and are adapted to advance the sprue lock pin 25 and the ejector pins 26 with the advancement thereof.

As shown in FIG. 1, a gap is formed between the ejector plate 32 and a rear end of the movable die 14 when the ejector pins 26 are located at their retracted position. The gap corresponds to a stroke of the ejector pins 26.

In order to process a molded product and enhance the quality of a molded product, first and second local pressurizing pins 34 and 35 are provided. The first local pressurizing pins 34 extend forwardly through the ejector plates 31 and 32 and the movable die 14 such that the tip ends of the first local pressurizing pins 34 face the gates 20. Accordingly, when the first pressurizing pins 34 are advanced, the gates 20 are closed and the resin in bosses 21a in front of the first local pressurizing pins 34 is pushed into the cavity 21. The second local pressurizing pins 35 extend forwardly through the ejector plates 31 and 32 and the movable die 14 such that the tip ends of the second local pressurizing pins 35 face thick-wall portions of the cavity 21. Accordingly, when the second pressurizing pins 35 are advanced, the resin in bosses 21b in front of the second local pressurizing pins 35 is pushed into the cavity 21.

The first and second local pressurizing pins 34 and 35 are designed to have effective strokes $L_A$ and $L_B$ which are different from each other. Other local pressurizing pins having a different stroke may be disposed in addition to the first and second local pressurizing pins 34 and 35.

Since head portions 34a formed at the rear ends of the first local pressurizing pins 34 are clamped by the first pressurizing plates 36 and 37 for fixing, the effective stroke $L_A$ of the first local pressurizing pins 34 is equal to the stroke $L_C$ of the first pressurizing plates 36 and 37 during mold clamping.

Stepped portions 35a formed at the rear ends of the second local pressurizing pins 35 are movably received by stepped portion receiving spaces 38 formed between the first pressurizing plates 36 and 37. Rear pin portions 35b project from the rear ends of the stepped portions 35a and penetrate the first pressurizing plate 37.

The depth or axial length of the stepped portion receiving spaces 38 is larger than the thickness of the stepped portions 35a so that a gap $L_D$ is formed between each stepped portion 35a and the first pressurizing plate Accordingly, the effective stroke $L_B$ of the second local pressurizing pins 35 is shorter than the effective stroke $L_A$ of the first local pressurizing pins Accordingly, when the first pressurizing plates 36 and 37 are advanced, the advancing movement of the second local pressurizing pins 34 is started after the first local pressurizing pins 35 have been advanced by a predetermined distance. In this embodiment, the gap $L_D$ is set to be greater than the difference Δ between the effective stroke $L_A$ of the first local pressurizing pins 34 and the effective stroke $L_B$ of the second local pressurizing pins 35.

In addition, a second pressurizing plate 39 is disposed at the rear side of the first pressurizing plate 37 and is adapted to move into and out of contact with the first pressurizing plate 37. Sleeves 41 are disposed at predetermined locations on the rear surface of the second pressurizing plate 39 and rearwardly extend therefrom. Also, pressurizing sleeves 43 are disposed at the rear side of the sleeves 41 and are adapted to move into and out of contact with the sleeves 41. The sleeves 43 are connected to an unillustrated pressurizing cylinder which is controlled by an unillustrated solenoid-controlled proportional reducing valve. The internal pressure of the pressurizing cylinder is controlled by the solenoid-controlled proportional reducing valve, so that the second pressurizing plate 39 is advanced and retracted via the pressurizing sleeves 43. With this operation, the second local pressurizing pins 35 are advanced and retracted.

The pressurizing cylinder generates a high output power with a short stroke. The internal pressure of the pressurizing cylinder is controlled by a pressurizing/vibrating program so that the pressure elevates stepwise while repeating increase and decrease, thereby advancing the second local pressurizing pins 35 while being vibrated. It is also possible to further advance the second local pressurizing pins 35 for ejecting a molded product during mold opening, after the resin in the bosses 21b has been pushed out into the cavity 21 by the advancing movement of the second local pressurizing pins 35. Namely, the pressurizing sleeves 43 function as an ejector as well as a pressurizing means.

Moreover, ejector rods 44 are disposed in the pressurizing sleeves 43 and are adapted to pass through the second pressurizing plate 39 for separably contacting the first pressurizing plate 37. The ejector rods 44 are connected to an unillustrated ejector cylinder. The amount of fluid supplied to the ejector cylinder is controlled by a solenoid-controlled proportional flow control valve while the pressure of the fluid is controlled by a solenoid-controlled proportional reducing value. With this operation, the first pressurizing plates 36 and 37 are advanced and retracted for reciprocating movements of the first local pressurizing pins 34.

After the first local pressurizing pins 34 have been advanced to close the gates, the pins 34 are further advanced to push the resin in the bosses 21a into the cavity 21. When the first pressurizing plate 36 contacts the ejector plate 32, the advancing movement of the first local pressurizing pins 34 is stopped. During mold opening, the first local pressurizing pins 34, the sprue lock pin 25 and the ejector pins 26 are advanced by further advancing the ejector rods 44 so that the molded product is ejected out. The ejector rods 44 have a function of an ejector as well as a function of pressurizing means.

Numeral 51 denotes pressurizing plate guide pins for guiding the first pressurizing plates 36 and 37, and the second pressurizing plate 39. Numeral 52 denotes ejector return pins while numeral 53 denotes pressurizing plate return pins.

Next, the operation of the local pressurizing type injection molding machine having the above-described structure will be described with reference to FIG. 4.

Figure 4:
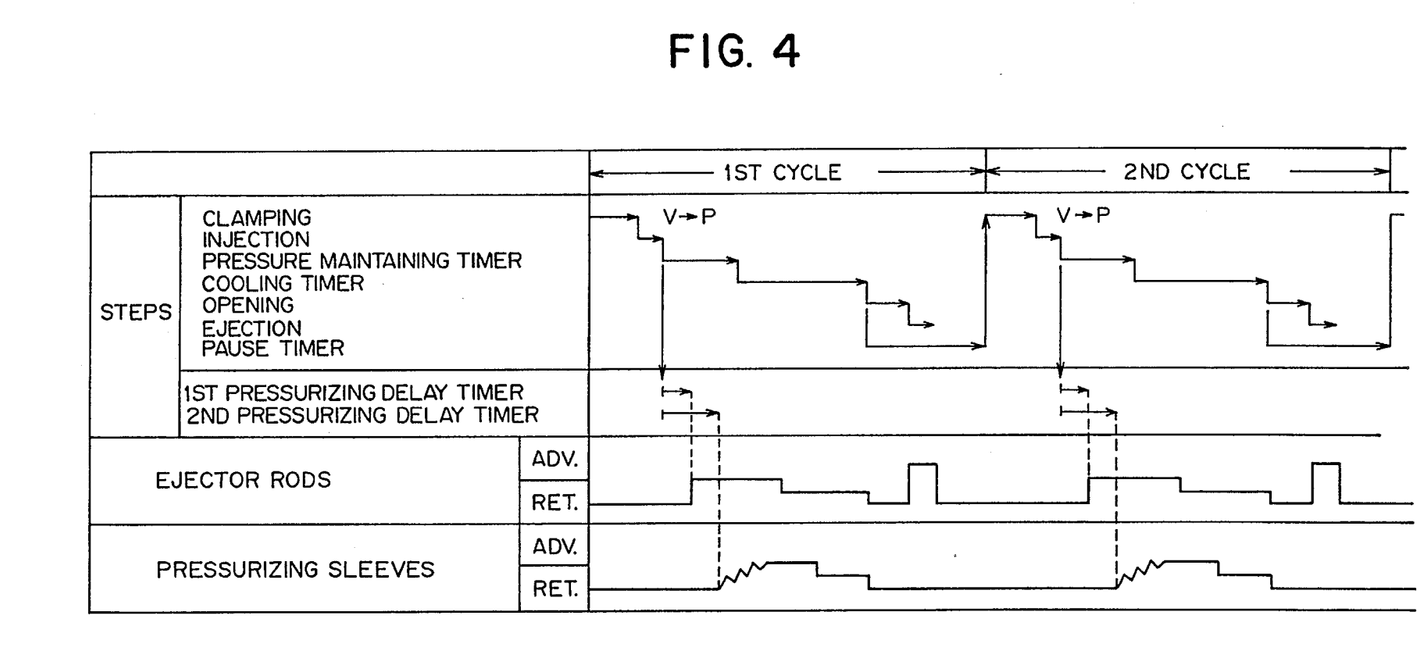
FIG. 4 is a time chart showing the operation of the injection molding machine shown in FIG. 1.

FIG. 4 is a time chart showing the operation of the injection molding machine.

After the movable and stationary dies have been clamped by advancing the movable platen, the injection nozzle is advanced so that the injection nozzle is contacted with the sprue bush 13. Subsequently, a molten resin is injected from the injection nozzle. The resin injected from the injection nozzle enters the runner 19 through the sprue 18 and is then charged into the cavity 21 formed between the stationary die 12 and a movable die 14 via the submarine type gates 20. At this time, the molten resin is also charged into the bosses 21a and 21b.

Thereafter, the control mode is switched from a velocity control mode to a pressure control mode, and a pressure maintaining step is started while an unillustrated pressure maintaining timer is simultaneously started. When the pressure maintaining timer has completed its clocking, a cooling step is started and an unillustrated cooling timer is simultaneously started. Simultaneously with the switching from the velocity control mode to the pressure control mode, unillustrated first and second pressurizing delay timers are started. When the first pressurizing delay timer has completed its clocking, the ejector cylinder is activated so that the ejector rods 44 are advanced and are contacted with the first pressurizing plate 37. With this operation, the first pressurizing plates 36 and 37 are advanced so that the first local pressurizing pins 34 are advanced to close the gates. As a result, the cavity 21 is separated from the runner 19.

At this time, the resin in the cavity 21 shrinks and its specific volume decreases. Since thick-wall portions shown in FIG. 1 are cooled last, sinks are produced therein. To solve this problem, when the second pressurizing delay timer has completed its clocking, the pressurizing cylinder is driven so that the pressurizing sleeves 43 are advanced and are contacted with the sleeves 41. As a result, the second pressurizing plate 39 is advanced so that the second local pressurizing pins 35 are advanced to push the resin in the bosses 21b into the cavity 21.

In this case, the second local pressurizing pins 35 can be advanced with a vibration by increasing the internal pressure of the pressurizing cylinder stepwise while repeatedly increasing and decreasing the pressure. With this operation, the resin in the bosses 21b can be easily pushed into the cavity 21 by the second local pressurizing pins 35. In this case, the stroke of the second pressurizing plate 39 is equal to the effective stroke $L_C$ of the second local pressurizing pins 35. The second local pressurizing pins 35 may be advanced without vibrations.

As described above, even in the case where the resin in the cavity 21 shrinks due to cooling after the charging of the resin is stopped by the separation of the cavity 21 from the runner 19, the pressure of the resin in the cavity 21 can be made uniform, because the resin in the bosses 21a and 21b is pushed into the cavity 21 by the first and second local pressurizing pins 34 and 35. Accordingly, the generation of sinks can be prevented.

Namely, it is possible to make the portions of the finished surface corresponding to the gates smooth, as well as to prevent the generation of sinks.

Although the gap $L_D$ becomes smaller as the first pressurizing plates 36 and 37 are advanced, the gap $L_D$ does not become zero because the gap $L_D$ is set to be greater than the difference $\Delta$ between the effective stroke $L_A$ of the first local pressurizing pins 34 and the effective stroke $L_B$ of the second local pressurizing pins 35. Therefore, the second local pressurizing pins 35 are not advanced by the first pressurizing plates 36 and 37.

As described above, the advancing movements of the pressurizing sleeves 43 and the ejector rods 44 can be started at different points in time. Accordingly, the gate-closing can be started at a point in time different from that for starting pressurizing. Further, since the gate-closing and the pressurizing are effected by different cylinders, i.e., the ejector cylinder and the pressurizing cylinder, the molding process can be controlled in accordance with an arbitrary program in which different pressures are used for the gate-closing and the pressurizing. Additionally, in the case where there are pressurizing, ejecting or other operations which are unnecessary for the molding step, the pressurizing cylinder and the ejector cylinder can be stopped during the molding step.

Subsequently, ejector rods 44 are advanced to open the mold, while the first local pressurizing pins 34, the sprue lock pin 25 and the ejector pins 26 are advanced for ejecting the molded product. As described above, since the pressurizing sleeves 43 and the ejector rods 44 perform the ejection of the molded product as well as the gate-closing and the pressurizing, the structure of the machine can be simplified. The ejecting operations by the first local pressurizing pins 34, the sprue lock pin 25 and the ejector pins 26 are started at the same time.

After the mold opening step, an unillustrated pause timer starts its clocking. When the pause timer has competed its clocking, the mold clamping step in the next cycle is started.

Next, a second embodiment of the present invention will be described in connection with FIG. 3.

Figure 3:
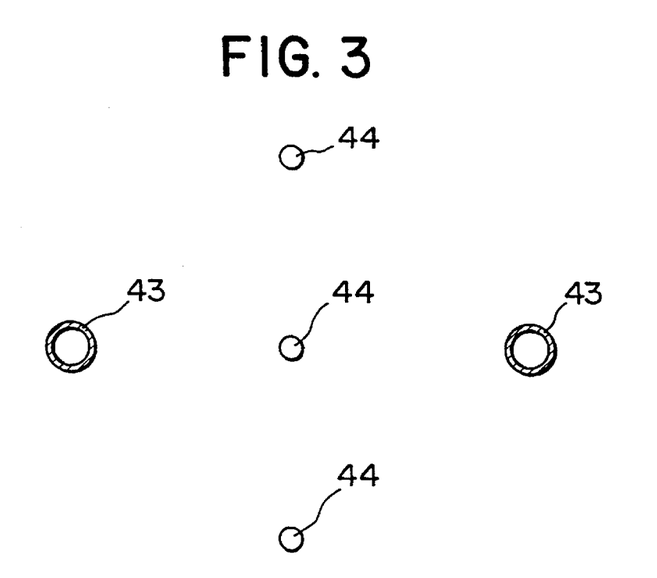
FIG. 3 is a sectional view of the pressurizing sleeves and the ejector rods according to a second embodiment of the present invention.

In FIG. 3, numeral 43 denotes pressurizing sleeves, and numeral 44 denotes ejector rods. In this embodiment, the tip portions of the ejector rods 44 located in the pressurizing sleeves 43 are removed. Further, the tip portions of the pressurizing sleeves 43 may be removed.

Next, a third embodiment of the present invention will be described in connection with FIG. 5.

Figure 5:
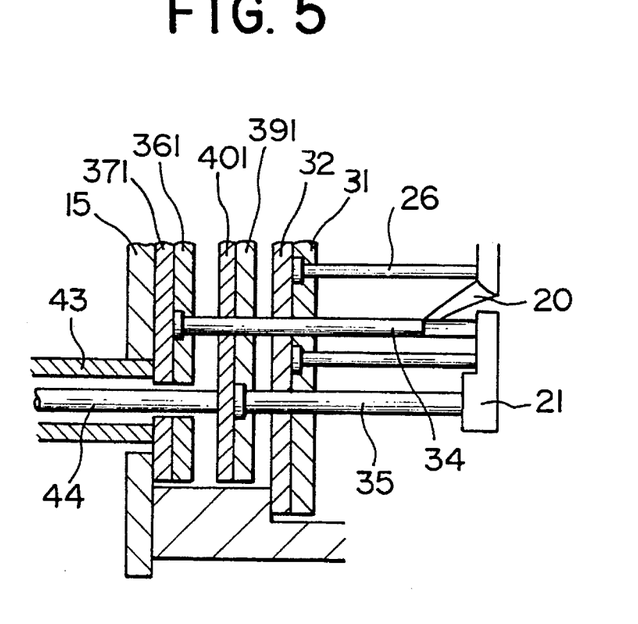
FIG. 5 is a sectional view of a local pressurizing type injection molding machine according to a third embodiment of the present invention.

In FIG. 5, numeral 15 denotes a movable die mounting plate, numeral 20 denotes a gate, numeral 21 denotes a cavity, numeral 26 denotes an ejector pin, numerals 31 and 32 denote ejector plates, numeral 34 denotes a first local pressurizing pin, numeral 35 denotes a second local pressurizing pin, numeral 43 denotes a pressurizing sleeve, and numeral 44 denotes an ejector rod.

In this case, the pressurizing sleeve 43 is disposed for separable contact with the rear end surface of first pressurizing plates 361 and 371 to which the first local pressurizing pin 34 is fixed, while the ejector rod 44 is disposed for separable contact with the rear end surface of second pressurizing plates 391 and 401 to which the second local pressurizing pin 35 is fixed.

Accordingly, the first local pressurizing pin 34 can be advanced by the pressurizing sleeve 43, while the second local pressurizing pin 35 can be advanced by the ejector rod 44.

Next, a fourth embodiment of the present invention will be described.

Figure 6:
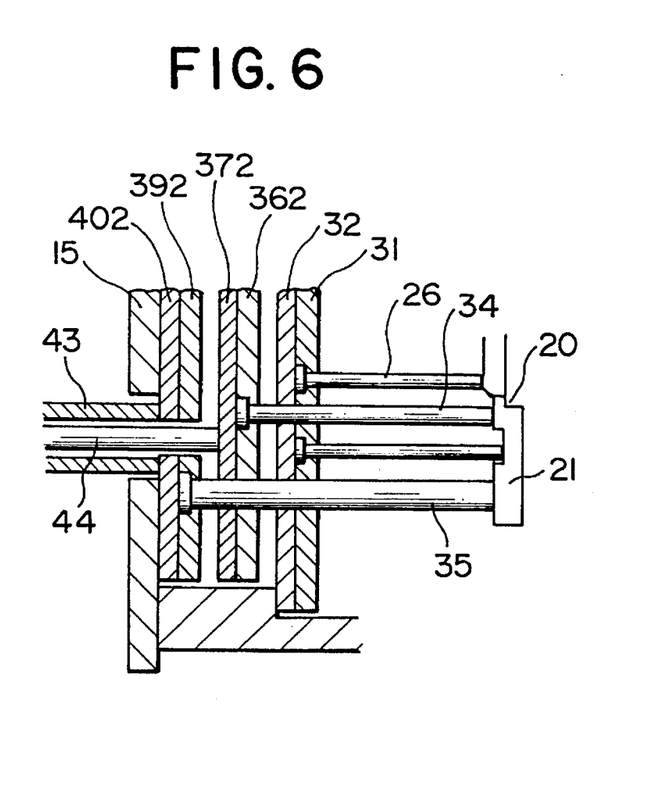
FIG. 6 is a sectional view of a local pressurizing type injection molding machine according to a fourth embodiment of the present invention.

FIG. 6 is a sectional view of a local pressurizing type injection molding machine according to the fourth embodiment.

In this drawing, numeral 15 denotes a movable die mounting plate, numeral 20 denotes a gate, numeral 21 denotes a cavity, numeral 26 denotes an ejector pin, numerals 31 and 32 denote ejector plates, numeral 34 denotes a first local pressurizing pin, numeral 35 denotes a second local pressurizing pin, numeral 43 denotes a pressurizing sleeve, and numeral 44 denotes an ejector rod.

In this case, the ejector rod 44 is disposed for separable contact with the rear end surface of first pressurizing plates 362 and 372 to which the first local pressurizing pin 34 is fixed, while the pressurizing sleeve 43 is disposed for separable contact with the rear end surface of second pressurizing plates 392 and 402 to which the second local pressurizing pin 35 is fixed.

Accordingly, the second local pressurizing pin 35 can be advanced by the pressurizing sleeve 43, while the first local pressurizing pin 34 can be advanced by the ejector rod 44.

Obviously, numerous modifications and variations of the present invention are possible in light of the above teachings. It is therefore to be understood that within the scope of the appended claims, the present invention may be practiced otherwise than as specifically described herein.

What is claimed is:

1. A method of molding a product by local pressurizing injection molding of a resin, said method comprising the steps of:
   (a) filling a cavity formed between a stationary die and a movable die with the resin through a gate;
   (b) advancing a first local pressurizing pin to close the gate and to produce a first pressurizing force on the resin, at a first point in time;
   (c) advancing a second local pressurizing pin to force additional resin into the cavity at a second point in time different from the first point in time to produce a second pressurizing force on the resin; and
   (d) advancing an ejector pin into the cavity and simultaneously further advancing said first local pressurizing at a third point in time, different from said first and second points in time, to eject a molded product.

2. A method of molding a product according to claim 1, wherein said first pressurizing force is different from said second pressurizing force.

3. A method of molding a product according to claim 1, wherein at least one of said first local pressurizing pin and said second local pressurizing pin is advanced while being vibrated.

4. A local pressurizing injection molding apparatus comprising:
   (a) a stationary die;
   (b) a movable die disposed for movement into and out of contact with said stationary die and defining a cavity between said dies when in contact with said stationary die;
   (c) a first local pressurizing pin extending through said movable die for opening and closing a gate, said gate admitting a molding material into said cavity;
   (d) a second local pressurizing pin extending through said movable die and having a tip facing the cavity;
   (e) an ejector pin extending through said movable die for ejecting a molded product from said movable die;
   (f) first advancing means for advancing said first local pressurizing pin, toward said cavity, to an advanced position closing said gate;
   (g) second advancing means for advancing said second local pressurizing pin toward said cavity while said first pressurizing pin remains stationary in said advanced position;
   (h) ejector means for advancing and retracting said ejector pin;
   (i) means for individually setting different points in time at which advancing movements of said first local pressurizing pin, and said second local pressurizing pin and said ejector pin are started and for individually setting pressurizing pressures produced by said first local pressurizing pin and said second local pressurizing pin; and
   vibrating means for vibrating at least one of said first and second advancing means.

5. A local pressurizing injection molding apparatus according to claim 4, wherein said first advancing means is pressurizing means, and said second advancing means is ejector means.

6. A local pressurizing injection molding apparatus according to claim 4, wherein said first advancing means is ejector means, and said second advancing means is pressurizing means.

7. A local pressurizing injection molding apparatus comprising:
   (a) a stationary die having a sprue for injection of a molding material therethrough;
   (b) a movable die having first, second and third bores extending therethrough, said movable die being disposed for movement into and out of contact with said stationary die and defining a cavity and a runner between said dies when in contact with said stationary die, said runner being in fluid communication with said sprue and said bores opening into said cavity;
   (c) a gate formed in said movable die for providing fluid communication between said runner and said first bore;
   (d) a first local pressurizing pin extending through said first bore in said movable die for opening and closing said gate and for forcing molding material out of said first bore and into said cavity;
   (e) a second local pressurizing pin extending through said second bore in said movable die for forcing molding material out of said second bore into said cavity;
   (f) an ejector pin extending through said third bore in said movable die for ejecting a molded product;
   (g) an ejector plate to which said ejector pin is fixed;
   (h) a first pressurizing plate to which said first local pressurizing pin is fixed and by which said second local pressurizing pin is supported;
   (i) ejector means for advancing said first pressurizing plate and said ejector pin;
   (j) a second pressurizing plate mounted for movement into and out of contact with said first pressurizing plate and for advancing said second local pressurizing pin; and
   (k) means for advancing said second pressurizing plate.

8. A local pressurizing injection molding apparatus according to claim 7 wherein said first and second pressurizing plates and said ejector plate are arranged in parallel on one side of said movable die, opposite said stationary die.

9. A local pressurizing injection molding apparatus according to claim 7 wherein said second local pressurizing pin includes a collar portion and wherein said first pressurizing plate has a bore therethrough, said second local pressurizing pin extending through said bore in said first pressurizing plate, said bore in said first pressurizing plate having an enlarged central portion housing said collar and defining means for limiting movement of said second local pressurizing pin relative to said first pressurizing plate to a distance $L_D$.

10. A local pressurizing injection molding apparatus according to claim 9 wherein said first local pressurizing pin advances through a distance $L_A$ and said second localized pressurizing pin advances through a distance $L_B$ and wherein $L_A$ is greater than $L_B$ and the difference between $L_A$ and $L_B$ is less than $L_D$.

* * * * *

UNITED STATES PATENT AND TRADEMARK OFFICE
CERTIFICATE OF CORRECTION

PATENT NO. : 5,512,223
DATED     : April 30, 1996
INVENTOR(S) : Nobuo MORIKITA

It is certified that error appears in the above-indentified patent and that said Letters Patent is hereby corrected as shown below:

On the titl page:

<u>IN THE ABSTRACT</u>:

Line 3, "diet" should read --die,--;

Line 10, "pint" should read --pin,--.

<u>IN THE SPECIFICATION</u>:

Col. 4, line 5, "inventions" should read --invention,--; and
      line 13, "inventions" should read --invention,--.

Col. 5, line 63, after "plate" insert --37.--; and
      line 66, after "pins" insert --34.--.

Col. 9, line 29, after "pressurizing" insert --pin,--.

Signed and Sealed this

Seventeenth Day of December, 1996

Attest:

BRUCE LEHMAN

*Attesting Officer*      *Commissioner of Patents and Trademarks*